US010909533B2

(12) United States Patent
Srivastava et al.

(10) Patent No.: US 10,909,533 B2
(45) Date of Patent: Feb. 2, 2021

(54) SYSTEM AND METHODS OF SECURELY MATCHING A BUYER TO A SELLER

(71) Applicant: StreamSource Technologies, New York, NY (US)

(72) Inventors: Tushar Srivastava, New York, NY (US); Prerit Srivastava, Gurugram (IN); Mayank Tewari, Gurugram (IN); Houman Motaharian, New York, NY (US)

(73) Assignee: Stream Source Technologies, New York, NY (US)

( * ) Notice: Subject to any disclaimer, the term of this patent is extended or adjusted under 35 U.S.C. 154(b) by 0 days.

(21) Appl. No.: 16/352,397

(22) Filed: Mar. 13, 2019

(65) Prior Publication Data
US 2020/0294037 A1 Sep. 17, 2020

(51) Int. Cl.
G06Q 20/38 (2012.01)
G06Q 40/02 (2012.01)
G06Q 30/06 (2012.01)

(52) U.S. Cl.
CPC ....... G06Q 20/383 (2013.01); G06Q 30/0609 (2013.01); G06Q 40/025 (2013.01)

(58) Field of Classification Search
CPC . G06Q 20/383; G06Q 30/0609; G06Q 40/025
See application file for complete search history.

(56) References Cited

U.S. PATENT DOCUMENTS

| 5,710,834 A | * | 1/1998 | Rhoads | G06K 7/14 380/202 |
| 5,995,947 A | | 11/1999 | Fraser et al. | |
| 6,684,393 B1 | * | 1/2004 | Loen | G06F 9/45516 707/999.202 |

(Continued)

FOREIGN PATENT DOCUMENTS

| AU | 752770 B2 | 9/2002 |
| AU | 785202 B2 | 11/2006 |

(Continued)

OTHER PUBLICATIONS

Srivastava, Tushar, et al., "System and Methods of Providing Point-of-Need Financing," Mar. 26, 2019, U.S. Appl. No. 16/365,312.

(Continued)

Primary Examiner — Scott C Anderson
(74) Attorney, Agent, or Firm — Andrew M. Metrailer

(57) ABSTRACT

A method of anonymously matching a buyer to a seller comprises receiving, at a server from the buyer, an approval model in byte code format, encrypting, by the seller, customer data to produce encrypted customer data, executing, by the server, the approval model using the encrypted customer data as an input, generating, by the server from the executed approval model, a transaction response, determining, by the server, that the transaction response comprises an approval of at least one product, publishing, to the server by the seller, the product lead, receiving, at the server from the buyer, an acceptance of the product lead based on the approval, and sending, by the server, the customer data to the (Continued)

buyer in response to receiving the acceptance of the product lead. The customer data can correspond to a product lead.

24 Claims, 8 Drawing Sheets

(56) References Cited

U.S. PATENT DOCUMENTS

| | | | |
|---|---|---|---|
| 7,013,290 B2 | 3/2006 | Ananian | |
| 7,630,933 B2 | 12/2009 | Peterson et al. | |
| 10,366,053 B1* | 7/2019 | Zheng | G06N 20/00 |
| 10,469,534 B2* | 11/2019 | Qureshi | H04L 9/0891 |
| 2004/0103065 A1* | 5/2004 | Kishen | G06Q 30/02 |
| | | | 705/64 |
| 2006/0129478 A1 | 6/2006 | Rees | |
| 2006/0178983 A1 | 8/2006 | Nice et al. | |
| 2008/0210754 A1 | 9/2008 | Lovett | |
| 2009/0094060 A1* | 4/2009 | Johnson | G06Q 10/10 |
| | | | 705/3 |
| 2010/0332617 A1* | 12/2010 | Goodwin | G06F 9/455 |
| | | | 709/219 |
| 2011/0313913 A1 | 12/2011 | Bennett et al. | |
| 2013/0080336 A1* | 3/2013 | Van Wie | G06Q 30/06 |
| | | | 705/80 |
| 2014/0214554 A1 | 7/2014 | Lang et al. | |
| 2014/0358765 A1 | 12/2014 | Agius et al. | |
| 2015/0278779 A1* | 10/2015 | Pfeifer | G06Q 20/384 |
| | | | 705/39 |
| 2016/0055474 A1* | 2/2016 | Syed | G06Q 20/20 |
| | | | 705/39 |
| 2016/0171555 A1 | 6/2016 | Buerger et al. | |
| 2016/0371771 A1 | 12/2016 | Serrano et al. | |
| 2017/0039330 A1 | 2/2017 | Tanner, Jr. et al. | |
| 2017/0046526 A1* | 2/2017 | Chan | G06Q 30/0214 |
| 2017/0206562 A1* | 7/2017 | Mowry | G06Q 30/0269 |
| 2018/0067736 A1* | 3/2018 | De Zaeytijd | G06F 9/5072 |
| 2018/0075527 A1 | 3/2018 | Nagla et al. | |
| 2018/0293553 A1* | 10/2018 | Dembo | G06Q 20/0655 |
| 2018/0322561 A1 | 11/2018 | Arora | |
| 2019/0149429 A1* | 5/2019 | Stocker | H04L 41/20 |
| | | | 709/225 |
| 2019/0229921 A1* | 7/2019 | Pulsifer | H04L 9/088 |
| 2020/0311808 A1 | 10/2020 | Srivastava et al. | |

FOREIGN PATENT DOCUMENTS

| | | |
|---|---|---|
| WO | 2020186019 A1 | 9/2020 |
| WO | 2020198203 A1 | 10/2020 |

OTHER PUBLICATIONS

Foreign Communication from a Related Counterpart—International Search Report and Written Opinion, dated Jul. 20, 2020, PCT/US2020/022318, filed on Mar. 12, 2020.

* cited by examiner

SYSTEM AND METHODS OF SECURELY MATCHING A BUYER TO A SELLER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Buyers and sellers interact in a number of ways in today's markets. In general, sellers require certain information in order to complete a transaction with a buyer, including information of a personal or sensitive nature for individuals or companies. Often this information is transferred prior to the completion of the transaction to demonstrate that the buyer has the assets to close the transaction to the satisfaction of the seller. During this process, the sensitive information may be disclosed, and if the transaction is not completed, there is no way for the buyer to protect the information.

One such situation is the lending markets where a company or consumer may seek credit from a lender. Credit mechanisms provide a foundation for much of retail business. Consumers who have an income that is insufficient may be enabled by lending mechanisms to purchase retail products such as furniture, vehicles, and houses that otherwise they would not purchase. Such credit mechanisms add vigor to national economies and build the standards of living of citizens. Lenders may take into consideration a variety of factors in evaluating whether to lend money to a consumer and/or what kind of credit product to offer to the consumer. For example, a consumer history of borrowing and paying back prior credit loans, a consumer employment history, consumer personal information, and/or a consumer income may be evaluated. In many cases, lenders may obtain consumer information from a third party, for example from a credit bureau. The credit bureau may provide, with the consumer's permission, such personal identifiable information (PII) to the lender. Alternatively, in some cases, the credit bureau may provide instead, or in addition, a credit score.

SUMMARY

In some embodiments, a method of anonymously matching a buyer to a seller comprises receiving, at a server from the buyer, an approval model in byte code format, encrypting, by the seller, customer data to produce encrypted customer data, executing, by the server, the approval model using the encrypted customer data as an input, generating, by the server from the executed approval model, a transaction response, determining, by the server, that the transaction response comprises an approval of at least one product, publishing, to the server by the seller, the product lead, receiving, at the server from the buyer, an acceptance of the product lead based on the approval, and sending, by the server, the customer data to the buyer in response to receiving the acceptance of the product lead. The customer data can correspond to a product lead.

In some embodiments, a method of anonymously matching a buyer to a seller comprises storing, at a server from a buyer, an approval model in source code format, building, at the server, an approval model in byte code format based on the stored approval model in source code format, transmitting, by the server, the approval model in byte code format to a seller, receiving, by the server from the seller, encrypted customer data, decrypting, by the sever, the encrypted customer data, and providing a product associated with the approval model to a customer associated with the decrypted customer data.

In some embodiments, a computer system for anonymously matching a buyer to a seller comprises at least one processor; a non-transitory memory; and an application stored in the non-transitory memory that, when executed by the processor, receives from the buyer an approval model in byte code format, encrypts customer data to produce encrypted customer data, where the customer data corresponds to a product lead, executes the approval model using the encrypted customer data as an input, generates a transaction response from the executed approval model, determines that the transaction response comprises an approval of at least one product, publishes to the buyer the product lead, receives an acceptance of the product lead based on the approval from the buyer, and sends the customer data to the buyer in response to receiving the acceptance of the product lead.

In some embodiments, a method of communicating between private blockchain servers comprises: receiving, by a public communication cluster node at a first private blockchain node, a transaction protocol associated with a first transaction request at the first private blockchain node; receiving, by the first private blockchain node, the first transaction request for a first transaction; sending, by the first private blockchain node, the first transaction request with the first transaction to a transaction manager using the transaction protocol; executing, by the first private blockchain node, the first transaction based on the transaction protocol; and generating, by the first private blockchain node, an output from the first transaction.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
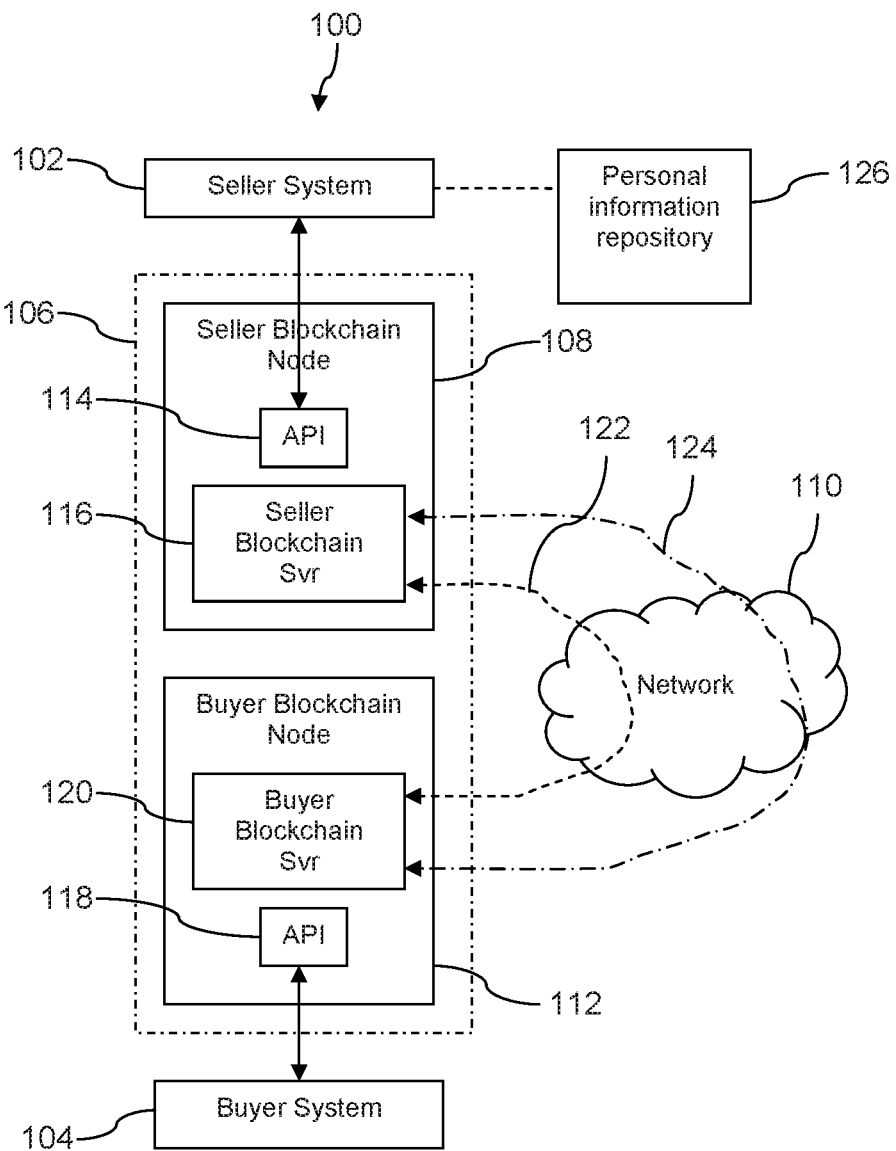
FIG. 1 is a block diagram of a system for matching a buyer to a seller according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In traditional lending processes, a consumer or agent can apply for a loan at a lender, merchant, lead aggregator, or the like, which can be referred to in some contexts as a loan originator (e.g., a platform that receives a customer looking for a loan). In this process, the customer can provide various credit and personal information to the loan originator as part of the loan process. The loan originator can be partnered with one or more lenders that can provide the loan across the credit spectrum (e.g., credit associated with different amounts of money, credit for different consumer products, credit for customers having different credit ratings or credit scores). Since most lenders do not accept credit scores across the spectrum, most loan originators partner with multiple lenders with different approval criteria to provide loans to a greater percentage of the loan originator's customers.

The loan originator can sell the leads (e.g., the opportunities to extend credit to customers) in order to obtain revenue (e.g., based on sales closed through financing of a purchase for a merchant model, as an example). For example, a fixed price per lead model can be used between a loan originator such as a merchant and a lender. Upon reviewing the leads, the lender may approve a portion of the leads for loans. Often the portion approved under this model can be relatively low, such as up to about 20% to 25%. The leads that are rejected typically are associated with customers having poor credit scores or otherwise deemed to be poor credit risks. As a result, the rejected leads often cannot be resold as they would likely fail the approval criteria of other lenders as well. Thus, these leads that are purchased are considered a sunk cost for the lenders, and the low acceptance rate increases the cost of acquiring loans for the lenders. In the event that a customer is rejected by all of the lenders, the customer may experience a poor customer experience at the loan originator, which can result in lost revenue for the loan originator.

The traditional loan approval process generally begins with the loan originator sequentially checking the leads against each lender's approval criteria. As an example, the lead can be sent to a first lender for consideration. The lead can include the loan information (e.g., financing amount, identity of the consumer product, price of the consumer product, name of the loan originator selling the product) as well as personal information about the customer (e.g., customer name, customer phone number, customer residential address, customer employer), which can be referred to as lead information. In general, a credit report is pulled for the customer as part of the loan approval process. The credit report can be pulled by the first lender, which can use the credit report information along with the lead information to compare with the first lender's approval criteria. If the first lender approves the loan, then an approval can be returned to the loan originator and the loan can be processed for the customer. However, if the first lender rejects the lead, then the process begins again with a second lender. For example, the lead information can be sent to the second lender for use in the loan approval process. The second lender can pull the credit report on the customer. The second lender can then either approve or reject the loan. If the loan is rejected, this process can continue until all of the lenders are exhausted or a lender approves the loan.

This type of sequential approval process can result in multiple credit reports being pulled for each customer when the customer is rejected. The customer's credit score can be hurt if more than a certain number of credit reports are pulled within a given time period. Loan originators are also generally required to obtain permission to share the customer's personal information (e.g., personally identifiable information—PII), such as their credit information. When the loan is sent to multiple lenders, this process can be tedious and time consuming. Further, the customer's PII can be shared between multiple parties including the loan originator and each lender considering the loan. This increases the likelihood that the customer's PII can be stolen or inadvertently disclosed, which in turn can expose the customer to identity theft and promote cybercrime.

Disclosed herein is a secure and decentralized marketplace for obtaining approvals for loans for customers. In the disclosed system, nodes can be established at the lender and at the loan originator. The lender's approval models can be loaded in byte code format into the loan originator's node, thereby shielding the details of the lender's model from the loan originator. As used herein, byte code refers to machine code that is modified from the original source code format such that the code cannot be reversed back into source code and cannot generally be understood or deciphered by a human. The use of byte code allows the lenders model and parameters within the approval model to be shielded from the merchant or seller. The system further retains customer PII of the customer on the loan originator server while the customer lead is analyzed according to one or more models, thereby enabling security for the customer. Within the lender database of models, a number of different lenders can provide approval models, thereby enabling the loan originator to check more than one lender's products at a time, with the models run using the customer PII in parallel on the loan originator's node. This allows for multiple approval models and lenders to be accessed for each set of customer data. This system further allows pulling credit information from a third party credit scoring bureau only once while analyzing the customer lead against a plurality of lender models, thereby avoiding damaging the customer's credit score.

The system can be implemented in part based on using a private blockchain with the blockchain nodes located at the loan originator site and at each lender site. Each of the transactions such as the approval model upload, PII push, lead evaluation, and the like can occur on the private blockchain, thereby ensuring an additional layer of security for both the customer PII as well as the lender approval model(s). Having a blockchain node at the lender allows the lenders to update, change, remove, or add additional approval models that can be sent to the loan originator blockchain node in bytecode format. This allows the loan originator to access the new lending models as soon as they are updated, while retaining the models as proprietary to the lender (e.g., the lender retains the human readable source code of its model and propagates a byte code version of its model to the loan originator node).

Unlike a third party system, the information is retained at the lender and merchant, thereby avoiding the potential of a third party platform from having access to customer PII or the lenders' approval models, thereby avoiding the possibility that the third party platform can be hacked to undesirably access the information. Rather, the present system prevents the third party intermediate from ever having access to the customer PII, credit report, or lenders' approval models. The present system can also use and rely on a private cryptocurrency that allows for an escrow account to be used to transfer money or credit for the lead once approved.

The present system then presents a number of advantages over other third party systems. For the loan originator, the system allows multiple lenders to be evaluated in parallel, thereby allowing for a faster and more complete evaluation of the lending options. The loan originator can then provide higher quality leads to the lenders while providing one or more options to the customers.

For the customer, a single application for credit can be used to find a lending product across multiple lenders, which is more convenient and hassle free for them. The present systems and methods also help to protect the customer data (e.g., PII) against a breach by retaining the information on the loan originator's system until a lending product is selected. This limits the disclosure of the PII to the one lender offering the product selected. This system also requests a credit report from a third party credit bureau by the loan originator one time, and this one credit report is then used across all of the lender models. This is distinct from a system that passes the PII to a third party or the lender where each validation requires a separate credit report pull, which can result in a decrease in the credit score of the customer.

For a lender to participate in the system, the lender simply transmits its approval model(s) to the loan originator in byte code format. Once the approval model(s) have been provided to the system, the lender receives only leads for customers that are pre-qualified based on the approval models from the system. The lender then may process the pre-qualified lead accordingly. Further, at the point at which the lender receives the lead, the customer has selected the approved lending product. This can save a significant amount of processing cost to the lender by reducing the overall lead rejection rate. In the event that a customer is rejected after the initial approval, the lead can be resold to another lender as the lead originates as a high quality lead. From the customer viewpoint, any such resale is seamless and improves the likelihood of a customer conversion.

While described in the context of loan originators and lenders, the present systems can also be used in other systems that utilize personal information of a customer with a model or validation criteria such that the personal information can be protected while also allowing certain seller criteria to remain unavailable to the buyer. For example health insurance markets or health care information exchanges can also use the systems and methods described herein to validate patient information across multiple health care providers and/or insurance companies while not sharing any personal information until a provider or health insurance plan is selected by the patient. This type of system can then help with maintaining compliance with the various regulations involving patient and healthcare information.

Figure 2:
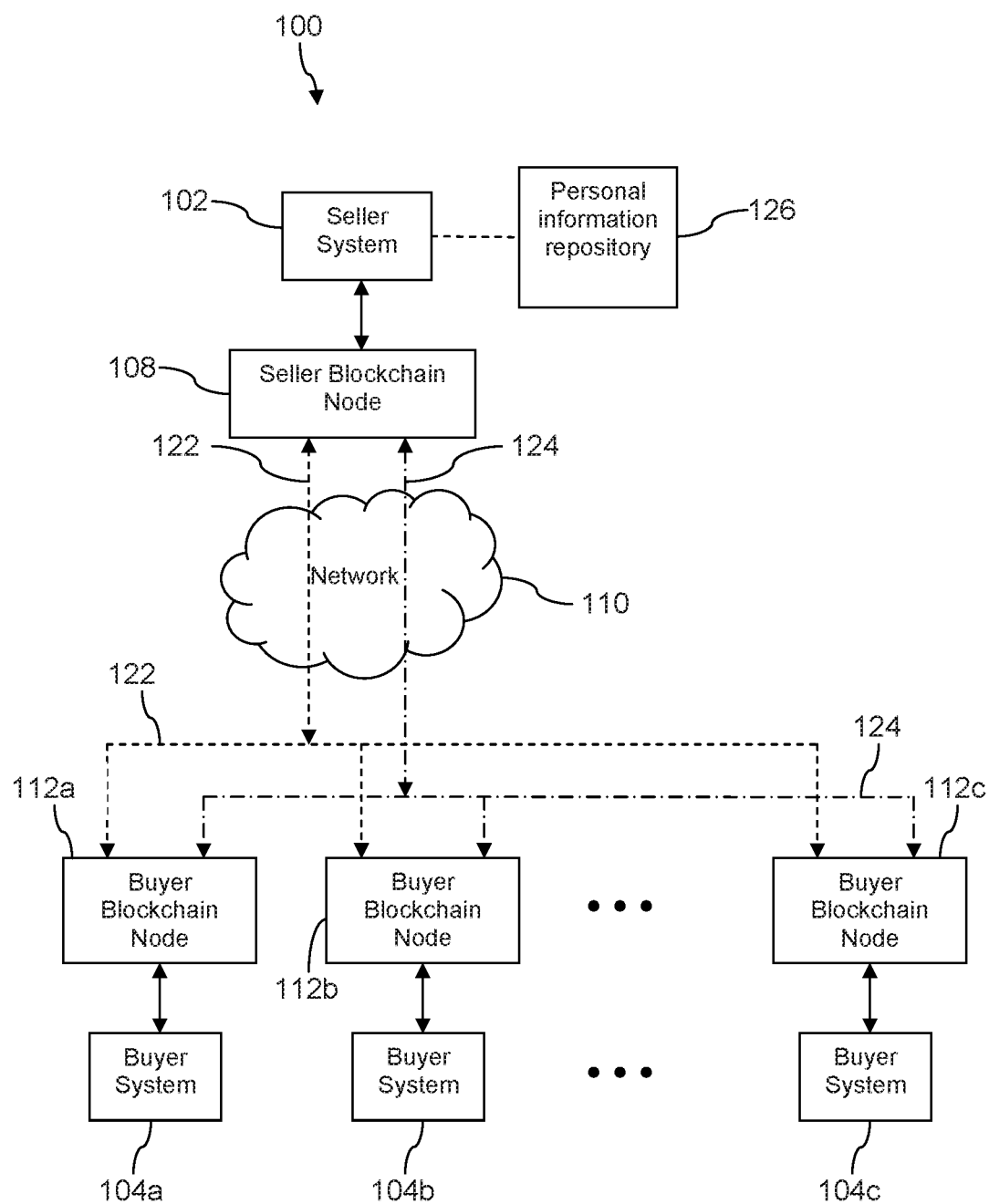
FIG. 2 is a block diagram of another aspect of the system for matching a buyer to a seller according to an embodiment of the disclosure.

Turning now to FIG. 1, a secure matching system 100 is described. In an embodiment, the system 100 comprises a seller system 102 and a buyer system 104. The seller system 102 and the buyer system 104 communicate with each other to match a buyer to a seller to provide a product or service, for example a loan to an end customer. The communication between the seller system 102 and the buyer system 104 during the processing of matching the buyer to the seller (versus during a subsequent process of completing a transfer of loaned funds) is conducted through a blockchain system 106 (e.g., exclusively through the blockchain system 106), whereby the benefits of protecting customer personally identifiable information (PII) and protecting the details of a lending model of the buyer systems 104 are provided. In FIG. 2 the system 100 is shown with a plurality of buyer systems 104, and the behavior of the system 100 where a plurality of buyer systems 104 are present is described hereinafter.

The blockchain system 106 comprises a seller blockchain node 108 and a buyer blockchain node 112 that communicate with each other via a network 110. The network 110 may comprise one or more private networks, one or more public networks, or a combination thereof. In an embodiment, the seller blockchain node 108 comprises a seller application programming interface (API) 114 and a seller blockchain server 116. It is understood that the seller blockchain node 108 can be located at a site that may be controlled by the seller, where the seller is able to assure physical security for the seller blockchain node 108 (e.g., restrict a buyer, as well as others, from accessing the seller blockchain node 108). In an embodiment, the buyer blockchain node 112 comprises a buyer API 118 and a buyer blockchain server 120. It is understood that the buyer blockchain node 112 can be located at a site that may be controlled by the buyer, where the buyer is able to assure physical security for the buyer blockchain node 112 (e.g., restrict a seller or another buyer, and others, from accessing the buyer blockchain node 112).

The seller blockchain node 108 and the buyer blockchain node 112 conduct both private communications and public communications with each other via the network 110. The blockchain communications (e.g., private blockchain communications and/or public blockchain communications) may be conducted over a private blockchain communication channel 122, and the public communications may be conducted over a public communication channel 124. Some of the private communications conducted over the private blockchain communication channel 122 comprise what may be referred to as private transactions, and some of the public communications conducted over the public communication channel 124 comprise what may be referred to as public transactions. In addition to private blockchain communications over the private blockchain communication channel 122, public communications between the blockchain nodes can also occur over the private blockchain communication channel 122. Since the public communications occurring over the private blockchain communication channel 122 can be limited to the blockchain nodes on the blockchain network, additional communications between components of the blockchain nodes (e.g., the API, other programs operating outside of the blockchain server, etc.) can rely on communications over the public communication channel 124 for various purposes, as described in more detail herein. The public transactions occurring over the public communication channel 124 can comprise information and files that are public and non-sensitive or non-secret in some embodiments. This non-private information can include information about the products and services, and/or transaction protocols or formats for the various blockchain transactions.

In an embodiment, the blockchain servers 116, 120 can be implemented as Quorum blockchain servers, and the private blockchain communication channel 122 can be implemented as a Quorum communication channel. In an embodiment, the public communication channel 124 can be implemented as an interplanetary file system (IPFS) communication channel. In other embodiments, however, the private blockchain communication channel 122 and/or the public communication channel 124 may be implemented with different technologies.

In operation, the buyer may build a purchase, credit, or approval model (referred to herein as an approval model) on the buyer system 104, for example code defining executable model logic and defining data values that collectively constitute the approval model. The buyer may store its approval model in the buyer system 104 in source code format (e.g., in a human readable format such as in a programming language or in a scripting language). The buyer may process the model source code with a software tool (e.g., a compiler and/or software development kit—SDK) to create a computer executable artifact such as an executable file of byte code or a plurality of executable files of byte code. The approval model may be referred to in some contexts as a lending model or a credit evaluation model.

The buyer system 104 may execute a method of the buyer API 118 to provide the buyer's approval model in byte code format to the buyer blockchain node 112, and the buyer blockchain server 120 may provide the byte code to the seller blockchain server 116 via the network 110, for example via the public communication channel 124 or the private blockchain communication channel 122, as described in more detail herein. Alternatively, in an embodiment, the buyer system 104 may execute a method of the buyer API 118 to provide the buyer's approval model in source code format to the buyer blockchain node 112, the buyer's blockchain node 112 may process the source code to generate the approval model in byte code format, and the buyer's blockchain server 120 may provide the buyer's approval model in byte code format to the seller blockchain server 116 via the network 110, for example via the public communication channel 124 or the private blockchain communication channel 122.

Note that the human readable source code form of the buyer's approval model is never present in the seller blockchain node 108, thereby maintaining the content and logic of the buyer's approval model confidential and hidden from the seller. The seller blockchain node 108 may store the byte code in a private partition of memory or storage. In an embodiment, the buyer may create different approval models and different corresponding approval model byte codes pertaining to different lending products that the buyer may offer. For example, a first approval model of the buyer may be associated with a first down payment percentage and a first interest rate associated with a first range of customer credit worthiness (e.g., a first range of credit score) and a second approval model of the same buyer may be associated with a second down payment percentage and a second interest rate associated with a second range of customer credit worthiness. In some embodiments, the buyer may create a plurality of approval models and transmit a plurality of approval model byte code packages to the seller blockchain node 108. In some embodiments, the approval model can contain model byte code for a plurality of lending products in a single byte code model.

When the seller system 102 has a lead (e.g., a customer or prospect who may wish to obtain credit), the seller system 102 can provide customer information to the seller API 114. The personal information repository 126 can be a data store that provides additional information about a customer such as account information, address, etc. The personal information repository 126 can include any source of personal information such as customer accounts at the seller, customer accounts at partner vendors, sellers, or merchants, profiles on social media, publicly available information, or the like. Using the personal information repository 126, the system can obtain the information necessary to provide to an approval model for approval of the customer.

The seller system 102 may pull a customer credit report from a credit bureau and/or information store using information from a personal information repository 126. The credit report can be pulled from a credit bureau and stored in the personal information repository 126, or separately pulled by the seller system 102 and/or the seller blockchain node 108. In some embodiments, the seller API 114 can generate the request and pull the customer credit report from a personal information repository 126 as an alternative to the seller system 102 and/or when the seller system 102 has not already pulled a credit report. While in FIG. 1 the seller system 102 is illustrated as directly linked via a dotted line to the personal information repository 126, in an embodiment the seller system 102 may communicate with the personal information repository 126 via the network 110. The seller system 102 may provide identifying information about the customer to the personal information repository 126 such as customer name, customer residential address, customer work address, customer social security number, customer phone number, customer driver's license number, customer date-of-birth, or other identifying information. In an embodiment, a seller system 102 may provide a first name, a middle initial, a last name, a street address, a city, a state, a zip code, and/or a social security number of the customer. The personal data repository 126 (e.g., a credit bureau, account store, etc.) may access information relating to a customer's credit worthiness such as outstanding indebtedness, kinds of indebtedness, debt payment history, income history, employment history, and public utility payment history. The personal information repository 126 may analyze this information to evaluate a creditworthiness of the customer and may generate a credit rating or a credit score based on the evaluation. The personal information repository 126 may provide a credit score or other information pertaining to creditworthiness of the customer to the seller system 102. The customer information that the seller system 102 provides to the seller API 114 may comprise customer identity information, customer contact information, and a credit score or other credit worthiness information.

Some or all of this customer information provided to the seller API 114 by the seller system 102 may be deemed personally identifiable information (PII) that is to be kept confidential. Government regulations and/or industry regulations may oblige the seller to protect the customer's PII and take prudent steps to prevent its inadvertent disclosure and to reduce the risk of a cyberattack accessing the customer's PII. The seller blockchain node 108 stores the PII in a private portion of memory or storage. Because the PII is retained on the seller blockchain node 108 and not propagated to the buyer blockchain node 112, the PII can be better protected by the seller.

The seller blockchain server 116 executes the byte code provided by the buyer using the PII of the customer as input. In some contexts this may be referred to as executing the approval model of the buyer using the PII of the customer as input. The result of executing the approval model of the buyer is an accept response or a reject response (e.g., the buyer accepts the lead and indicates it is willing to extend credit to the customer associated with the lead or the buyer rejects the lead and indicates it is not willing to extend credit to the customer). The accept response provided to the seller may identify one or more lending products and may include corresponding loan details such as a period over which the loan offer is valid, a loan amount, a payback period, an interest rate, a monthly payment amount, a minimum loan to value ratio, and other loan-related information. If the result is an accept response, the seller may provide information to the buyer enabling the buyer to contact the customer and complete the process of extending credit to the customer.

If the buyer has provided a plurality of approval models (e.g., as a plurality of model byte codes or a single model byte code representing a plurality of lending products), the executed model(s), as executing on the seller node, may generate more than one acceptance responses and these acceptance responses may be transmitted to the seller. The seller may present two or more lending products to the customer for selecting his or her preferred lending product or loan terms. The seller then sends the customer information to the buyer with a designation of which of the plurality of approved lending products the customer has selected.

In an embodiment, the seller blockchain node 108 may communicate the lead (e.g., customer contact information) to the buyer blockchain node 112, and the buyer blockchain node 112 may communicate the lead to the buyer system 104. Note that ultimately some or all of the customer PII may be communicated to the buyer having the selected lending product in the event of an approval result, but the PII is NOT communicated to the buyer in the event of a rejection result or to a buyer whose lending product is not selected (unless that buyer had another lending product that was selected). Additionally, had the approval models of a plurality of buyers been executed (see the discussion of FIG. 2 which relates to system 100 when a plurality of buyers are present), only the buyer associated with the acceptance would receive the customer PII and the other buyers would not receive the customer PII.

Turning now to FIG. 2, further details of the system 100 are described. In the example of the system 100 illustrated in FIG. 2, the seller system 102 interworks with a plurality of different buyer systems 104, for example a first buyer system 104a, a second buyer system 104b, and a third buyer system 104c. It is understood that the system 100 may comprise any number of buyer. The first buyer system 104a is in communication with a first buyer blockchain node 112a. The second buyer system 104b is in communication with a second buyer blockchain node 112b. The third buyer system 104c is in communication with a third buyer blockchain node 112c. The operation of system 100 illustrated in FIG. 2 is substantially similar to the operation of system 100 illustrated in FIG. 1, with the provision that FIG. 2 comprises a plurality of buyers.

While shown in FIG. 2 as having a single seller system interacting with a plurality of buyer blockchain nodes, it should be noted that the system can comprise a plurality of seller blockchain nodes, each connected to one or more buyer blockchain nodes as shown in FIG. 2. Accordingly, a blockchain system according to the embodiments shown herein can comprise a plurality of seller systems, seller blockchain nodes, buyer blockchain nodes, and buyer systems in a larger interacting environment according to any of the processes as described herein.

The seller blockchain node 108, the first buyer blockchain node 112a, the second buyer blockchain node 112b, and the third blockchain node 112c communicate with each other via the network 110, using the private blockchain communication channel 122 and the public communication channel 124. When the seller blockchain node 108 receives a lead from the seller system 102, the seller blockchain node 108 executes one or more approval model byte code packages associated with the first buyer system 104a, executes one or more approval model byte code packages associated with the second buyer system 104b, and executes one or more approval model byte code packages associated with the third buyer system 104c. The seller blockchain node 108 notifies the seller system 102 of any accept responses produced by the approval model byte code packages. The accept response provided to the seller system 102 may identify one or more lending products and may include loan details such as a period over which the loan offer is valid, a loan amount, a payback period, an interest rate, a monthly payment amount, a minimum loan to value ratio, and other loan-related information. The customer may select one of the loan packages associated with an accept response. The seller system 102 may then send the customer information identifying the selected loan package to the respective buyer system 104 identifying the selected loan package.

The buyer system 104 that provides the selected loan package may reach out to the customer through a variety of communication channels to complete the lending process. The buyer system 104 may provide terms and conditions of the loan to the customer. The customer may sign a contract binding him or her to honor the payback terms and other terms of the loan. The buyer system 104, when it has received the customer's contractual commitment, may provide funds to the seller system 102, for example to a loan originator (e.g., a merchant) system associated with a purchased product. In some embodiments, the buyer system 104 can provide the funds directly to the customer or a financial institution associated with the customer, and the customer can then use the funds to purchase the product. In an embodiment, the buyer system 104 may command the associated buyer blockchain node 112 to make payment to the seller blockchain node 108 in cryptocurrency. The settlement of the financial transactions may be resolved periodically through a system of escrow payments by the buyer systems 104.

It is noted that system 100—whether it involves a single buyer system 104 or whether it involves a plurality of buyer systems 104a, 104b, 104c—provides the benefits of confidentiality and protection of customer PII discussed above. The customer PII is maintained confidentially on the seller blockchain node 108 until a customer has accepted an approved loan product. The customer PII is then shared only with the one buyer (e.g., the buyer whose approval model generated an accept response that the customer selected). The customer PII is not shared with the other buyers, thereby reducing the exposure of the customer PII to hacking. The customer is further benefited in that the seller system 102 makes a single pull of credit worthiness information (e.g., a credit score) from the personal information repository 126, thereby avoiding damaging the customer's credit score by making a plurality of credit inquiries in a short period of time.

The system 100 also provides the confidentiality of the content of buyer models discussed above: the seller blockchain node 108 can execute the approval models of the buyers providing the customer information as input, but it cannot see the approval model source code. The buyer is able to easily update and change its approval model simply by creating the new or revised source code, processing this source code into an approval model byte code package, and pushing that purchase model byte code package to the seller blockchain node 108. In some embodiments, variables within the approval model can be updated within an existing approval model by initiating a transaction by the buyer. The transaction can be used to update information within the model such as variables, coefficients, and/or the applicability of one or more elements (e.g., by setting coefficients to zero) using a transaction request. This allows the models to be easily updated without the need to update the entire approval model while also having those changes be implemented with immediate effect. Since the seller blockchain node 108 uses whatever is the most current approval model byte code package it stores in its private storage, the buyer's changed approval model is effective immediately and seamlessly.

In some embodiments the approvals obtained from the approval model can result in a product being provided by the buyer to a customer. When a plurality of sellers are present in the system, more than one seller can be in communication with a given buyer. In this embodiment, the product provided to the seller for the customer may be in the form of a smart contract having executable code. The code provided by the buyer can in some embodiments comprise verification information for the customer. This can help to prevent the same customer from obtaining a product from the buyer across two or more sellers. As an example, a customer may obtain two approvals from the same lender from two separate sellers, by for example, applying through the two sellers at or near the same time. Since a buyer may only want to provide one product to a given customer, the first approval that is accepted by the customer can allow the buyer to log the customer into a database of accepted products. The logged information can be included in future products to provide a rule set for verifying if the customer should obtain a second product. If a second approval is accepted by the same customer, the code within the product can perform a verification to determine if the customer has already accepted an earlier product. For example, the product can comprise a list of customers or identifications of customers that have recently accepted products. By checking the list at the time the contract (e.g., that can comprise executable code) is provided to the customer, the product can reject the customer if the list indicates that the same customer should not receive another product. This allows buyers operating on a system with a plurality of sellers to build in cross-checks and verifications in the form of rules set into the products provided for customer acceptance based on approvals from the sellers.

Figure 3:
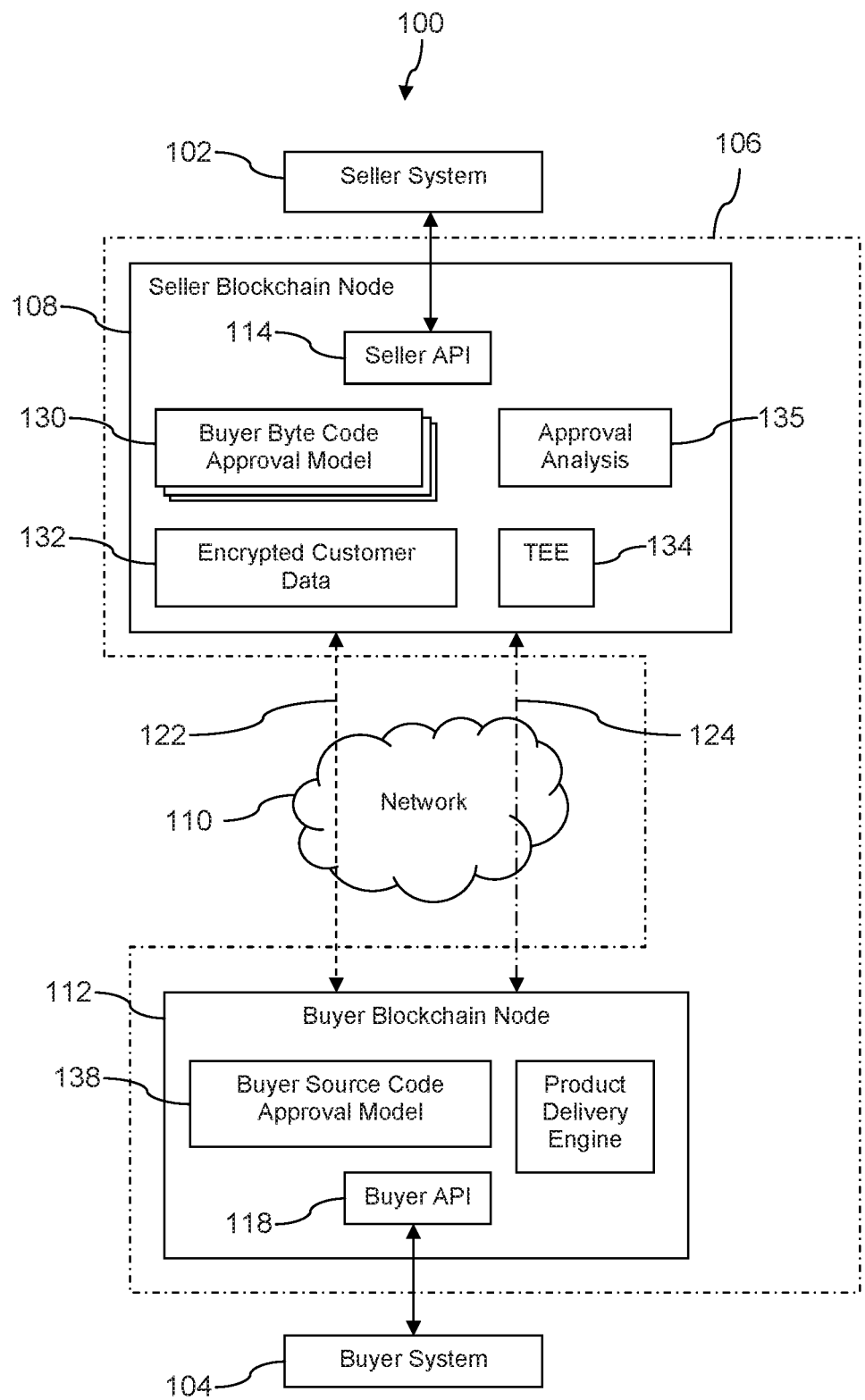
FIG. 3 is a block diagram of yet another aspect of the system for matching a buyer to a seller according to an embodiment of the disclosure.

Turning now to FIG. 3, further details of the blockchain nodes 108, 112 are described. The blockchain nodes 108, 112 can be used in the systems described with respect to FIGS. 1 and 2. In some embodiments, the seller blockchain node 108 stores at least one buyer byte code approval model 130. When the seller system 102 provides customer information associated with a customer lead, a trusted execution environment (TEE) 134 of the seller blockchain node 108 encrypts the customer information and stores it as encrypted customer data 132 in the private memory of the seller blockchain node 108. An approval analysis component 135 executes one or more of the buyer byte code approval models 130 in parallel, providing encrypted customer data 132 to the models 130 as input. The approval analysis component 135 receives responses from execution of the buyer byte code approval models 130 and returns the accept responses via the seller API 114 to the seller system 102 with appropriate buyer contact information and identities of specific product packages (e.g., specific loan packages) that are associated with approve responses. While the approval analysis component 135 may receive rejection responses from execution of the buyer byte code approval models 130, these rejections are not sent to the seller system 102. Alternatively, in an embodiment, rejection responses are also provided by the approval analysis component 135 via the seller API 114 to the seller system 102.

In an embodiment, the buyer blockchain node 112 stores one or more buyer source code approval models 138 in a private portion of memory of the buyer blockchain node 112. The buyer blockchain node 112 may then process the buyer source code approval models 138 to produce corresponding approval model byte code packages that are then sent to the seller blockchain node 108 via the private blockchain communication channel 122. The seller blockchain node 108 stores the approval model byte code packages in a private portion of memory of the seller blockchain node 108. Alternatively, the buyer system 104 stores one or more buyer source code approval models 138 in the buyer system 104 and provides only approval model byte code packages (e.g., one byte code package or file per different approval model, one byte code package or file per multiple different approval models, etc.) to the buyer blockchain node 112 for storing in the private portion of memory and for transmitting via the private blockchain communication channel 122 to the seller blockchain node 108. It is noted that when the approval analysis component 135 of the seller blockchain node 108 executes buyer byte code approval models 130, the buyer blockchain node 112 is not inherently engaged or informed. The evaluation is conducted on the basis of the approval model byte code package(s) previously provided by the buyer blockchain node 112.

When the seller system 102 has received one or more acceptance responses from the seller API 114, the seller system 102 may present the one or more purchase offers to a customer of the seller. For example, the seller may present the customer with a plurality of loan offerings with their associated terms and conditions. The customer may select one of the purchase offers. The seller system 102 may then pass customer information (e.g., PII) to the buyer system 104 through the network 110 via a different communication mechanism than either the private blockchain communication channel 122 or the public communication channel 124 between the blockchain nodes 108, 112. The buyer may perform some further analysis of the customer and/or the loan offer selected by the customer.

At this point the buyer may reject or accept the proposition of lending the customer money. In some embodiments, the buyer may accept the loan based on the acceptance response from the byte code model. It is noted, however, that even if the buyer rejects the lending opportunity, the analysis and ultimate rejection occurred in the context of a pre-screened, pre-approved loan recipient. It would be expected that the loan approval rate for such pre-screened loan recipients would be much higher than without relying on the system 100 for pre-screening, pre-evaluating loan recipients based on the buyer approval models. Such a rejected lead could then be sold to other buyers with a higher conversion rate.

If the buyer accepts, the buyer sends contractual or other binding instruments to the seller for the customer to accept (e.g., sign, esign, etc.). Upon the customer accepting, the buyer system 104 may transfer funds for the lead to the seller system 102. In an embodiment, the funds can be transferred pursuant to an established escrow account into which the buyer deposits funds and releases in incremental amounts as loans are approved and committed. Alternatively, in another embodiment, the funds can be transferred between the buyer system 104 and the seller system 102 in the form of cryptocurrency via the blockchain system 106.

Figure 4A:
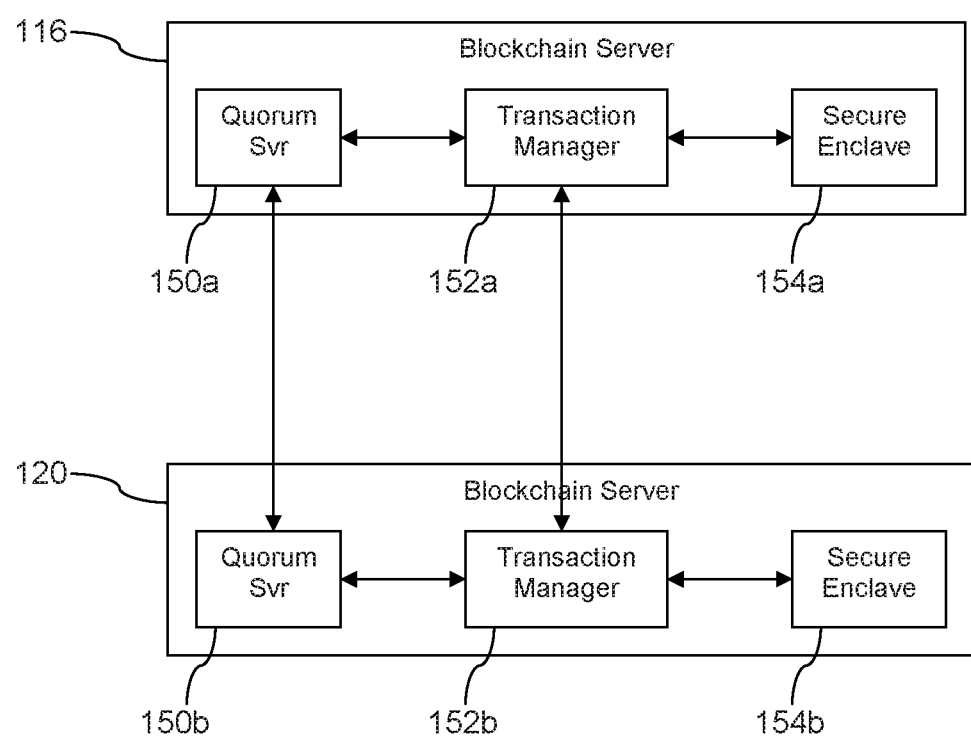
FIG. 4A is a schematic representation of blockchain servers according to an embodiment.

Turning now to FIG. 4A, further details about the blockchain servers 116, 120 are described. The blockchain servers 116, 120 can be used in any of the embodiments described with respect to FIGS. 1-3. In an embodiment, at least some of the blockchain system 100 is implemented using a Quorum distributed ledger protocol and uses private transactions to transmit information to targeted blockchain nodes. In an embodiment, the seller blockchain server 116 comprises a first Quorum server 150a, a first transaction manager 152a, and a first secure enclave 154a. In an embodiment, the buyer blockchain server 120 comprises a second Quorum server 150b, a second transaction manager 152b, and a second secure enclave 154b. In an embodiment, the first secure enclave 154a is substantially similar to the trusted execution environment 134 described above with reference to FIG. 3. The first transaction manager 152a can communicates with the second transaction manager 152b, and the first Quorum server 150a can communicate with the second Quorum server 150b.

When a private transaction is sent from the seller blockchain server 116 to the buyer blockchain server 120, the first Quorum server 150a sends the transaction to the first transaction manager 152a. The first transaction manager passes the private transaction to the first secure enclave 154a. The first secure enclave generates a symmetric key, encrypts the private transaction, determines a hash of the transaction, and encrypts the symmetric key with the public key of the recipient of the private transaction (in this case, the buyer blockchain server 120). The first secure enclave then returns the encrypted transaction, the hash of the transaction, and the encrypted symmetric key. The first transaction manager 152a sends the encrypted transaction, the hash of the transaction, and the encrypted symmetric key to the second transaction manager 152b. The second transaction manager 152b stores the encrypted transaction and the encrypted symmetric key in a private memory area indexed by the hash.

The first Quorum server 150a then sends a public transaction out to other Quorum servers 150 in the private blockchain system 106 that contains the hash of the encrypted transaction. Each receiving Quorum server 150 requests its associated transaction manager 152 to look up and decrypt the transaction associated with the hash. Only the second transaction manager 152b of the blockchain server 116, 120 designated as the recipient of the private transaction has an entry that is indexed by the hash. The transaction managers 152 of other blockchain servers return a message of "transaction not found" to their Quorum server, and the attempt to execute the private transaction is abandoned by those Quorum servers.

In this example, the second transaction manager 152b of the buyer blockchain server 120 does store an entry that is indexed by the hash. The second transaction manager 152b retrieves the indexed encrypted transaction and encrypted symmetric key and sends these to the second secure enclave 154b. The second secure enclave 154b decrypts the encrypted symmetric key with its own private key, uses this symmetric key to decrypt the encrypted transaction, and returns the decrypted transaction to the second transaction manager 152b. The second transaction manager 152b returns the decrypted transaction to the second Quorum server 150b. The second Quorum server 150b executes the decrypted transaction. Like procedures can be implemented for private transactions directed to two or more blockchain servers.

Figure 4B:
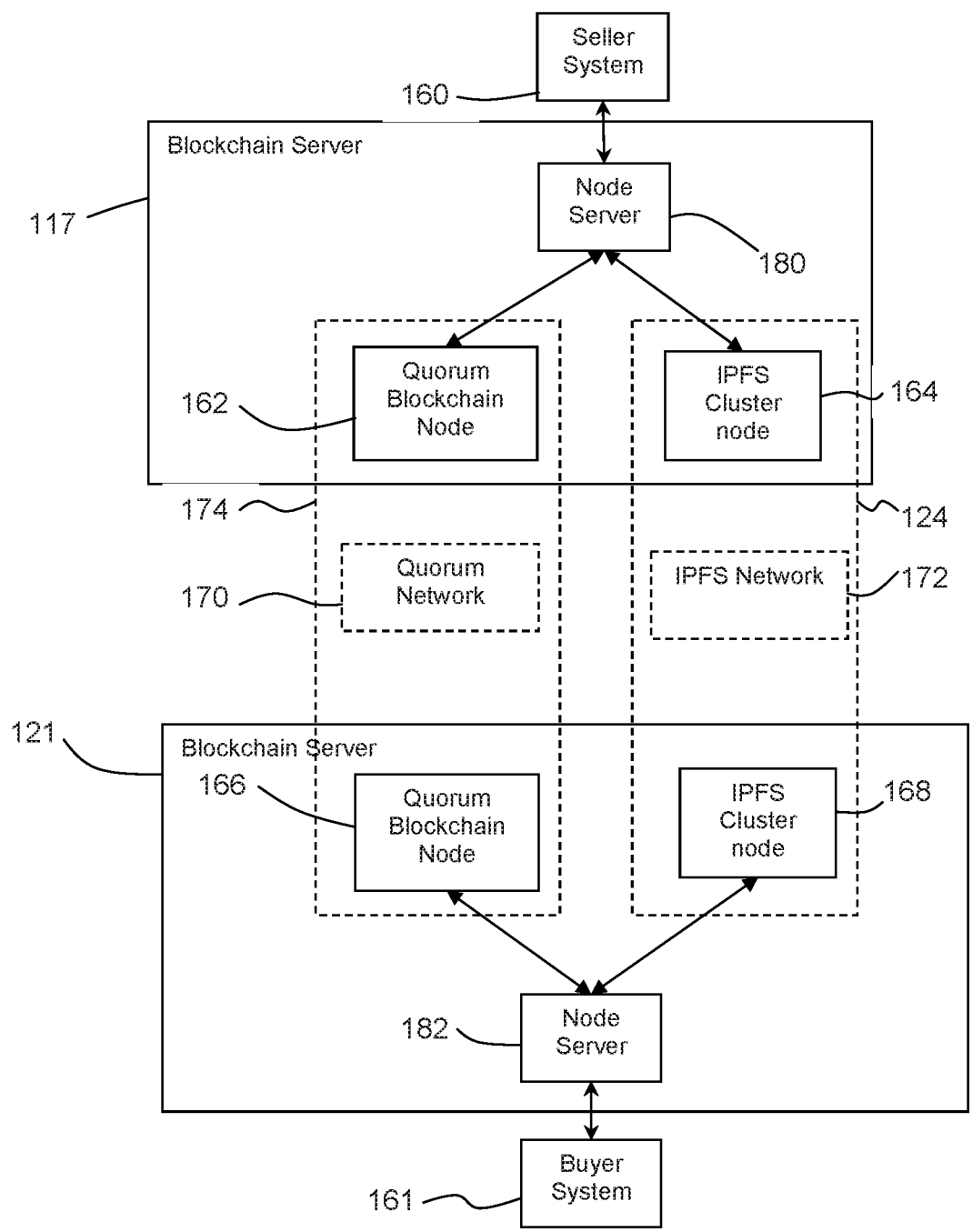
FIG. 4B is a schematic representation of another blockchain server system according to an embodiment.

Turning now to FIG. 4B, the blockchain servers can operate in connection with a public communication node such as an interplanetary file system (IPFS) communication node. The IPFS communication node can provide for non-secret communications. When operated with (e.g., as integrated into, etc.) the blockchain servers, the IPFS systems can allow for various information such as transaction information and protocols and/or the identity of new blockchain nodes to be propagated throughout the system. Since the information used in different transactions (e.g., execution of different approval models by different buyers, etc.) can change, the IPFS communications can be used to provide the format and/or execution protocols for the transactions occurring on the blockchain network. Further, the ability to communicate new node information (e.g., destination addresses, identifications, etc.) can allow for newly installed systems to be identified on the system as well as grouping or pairing the blockchain node of the seller to the respective buyers. In addition, public information that does not need to remain secret can also be transferred over the IPFS system to thereby reduce the communication burden on the Quorum network. This type of system allows an ecosystem of buyers and sellers to be formed that is scalable through improved communication and discovery of new nodes.

In an embodiment, the seller's blockchain server 117 can comprise a node server 180, a Quorum blockchain node 162, and a public communication server such as an IPFS cluster node 164. The seller's node server 180 can control operations of the seller blockchain server 117 and route information from the seller system 160 to the Quorum blockchain node 162 and/or the IPFS cluster node 164. In some embodiments, the seller's node server 180 can be implemented as a Node.js server that is in communication with the Quorum blockchain node 162 and the IPFS cluster node 164. The Quorum blockchain node 162 can be the same or similar to any of the blockchain nodes described herein, including the blockchain server as described with respect to FIG. 4A.

Similarly, the buyer's blockchain server 121 can comprise a buyer's node server 182, a Quorum blockchain node 166, and a public communication server such as an IPFS cluster node 168. The buyer's node server 182 can control operations of the blockchain server 121 and route information from the buyer system 161 to the Quorum blockchain node 166 and/or the IPFS cluster node 168. In some embodiments, the buyer's node server 182 can be implemented as a Node.js server that is in communication with the Quorum blockchain node 166 and the IPFS cluster node 168. The Quorum blockchain node 166 can be the same or similar to any of the blockchain nodes described herein, including the blockchain server as described with respect to FIG. 4A and FIGS. 1-3.

The Quorum blockchain node 162 of the seller's blockchain server 117 can communicate with the buyer's Quorum blockchain node 166 over a Quorum network 170 communicating over a communication channel 174. While shown as a single communication channel 174 between the Quorum blockchain nodes 162, 166, the same or similar channels (e.g., operating on a single Quorum network 170, etc.) can be used to connect one or more Quorum blockchain nodes associated with a seller or sellers, with one or more Quorum blockchain nodes associated with a buyer or buyers, thereby allowing for an ecosystem between different seller(s) and/or buyer(s).

During a transaction, the seller's node server 180 can selectively direct communications between the Quorum blockchain node 162 and/or the IPFS cluster node 164 as needed to facilitate a desired transaction. For use of the private blockchain system as described herein, the seller's node server 180 can direct communications and commands through the Quorum blockchain node 162. As part of those same transactions, or other transactions, the seller's node server 180 can direct communications and commands through the IPFS cluster node 164. Similarly, the buyer's node server 182 can selectively direct communications between the Quorum blockchain node 166 and/or the IPFS cluster node 168 as need to facilitate a desired transaction. For use of the private blockchain system as described herein, the buyer's node server 182 can direct communications and commands through the Quorum blockchain node 166. As part of those same transactions, or other transactions, the buyer's node server 182 can direct communications and commands through the IPFS cluster node 168. The transactions can occur as described in more detail herein.

As an example, a transaction occurring through the blockchain server can use information sent over the IPFS to direct the type of information and processing needed for the Quorum transaction. As an example, different approval models by different buyers may use different information and/or formats for the information as part of the approval models. In some embodiments, the information can be standardized across buyers. In other embodiments, the IPFS network can be used to specify the information and processing information as part of the blockchain transaction. Since the transaction protocol or format is not private or secret, the information does not need to take place over the blockchain network. A transaction can then occur based on the information initially provided over the IPFS network 172. As an example, a transaction protocol (e.g., an approval model input file format, transaction processing protocol, output file format, or the like) can be generate by a buyer system 161, sent through the buyer's node server 182, and communicated to the seller over the buyer's IPFS cluster node 168. The transaction protocol can then be sent through the IPFS network 172 to the IPFS cluster node 164 of the seller. The information can pass to the seller's node server 180. This transaction protocol can then be used when the seller's approval model is executed by the seller. For example, the information for the buyer's approval model can be collected, processed, formatted, and sent to the Quorum blockchain node 162 for use with the corresponding buyer's approval model as described herein. The resulting output from the approval model can then be optionally processed based on the transaction protocol passed over the IPFS network. This communication process allows for different types of models or processing protocols to be used by different buyers and/or sellers and properly communicated between the parties over the IPFS network. This is advantageous as it can be difficult, if not impossible, for this type of information to be passed over the blockchain network, especially when such non-private information can more easily be passed over a public communication network such as an IPFS network 172.

In some embodiments, the system can be used to register a seller's or buyer's blockchain server into the private blockchain network. Since the blockchain network is private, it can be difficult for the Quorum blockchain servers to carry out the process of registering new nodes on the blockchain system. By integrating the IPFS system, new blockchain servers or nodes can be introduced into the system. For example, when a new blockchain server is installed at a seller (as an example only, where the new installation could equally be at a buyer), the seller's node server 180 can direct a registration message to the IPFS cluster node 164. The IPFS cluster node can use the IPFS network 172 to contact corresponding IPFS cluster nodes of other sellers and/or one or more buyers to identify the new blockchain server to the other servers or nodes. The corresponding IPFS cluster nodes can communicate with their associated node servers, which can register the new system directly or by directing the registration with the associated Quorum blockchain node. Future communications by such Quorum blockchain nodes over the Quorum network 170 can then communicate with the newly registered blockchain servers or nodes using any of the processes as described herein. Thus, the integrated public communication node (e.g., the IPFS cluster node) can be used to provide for public communication of non-sensitive information and/or register new blockchain servers on the system to allow for scaling and integration of new buyers and sellers into the system.

Figure 5:
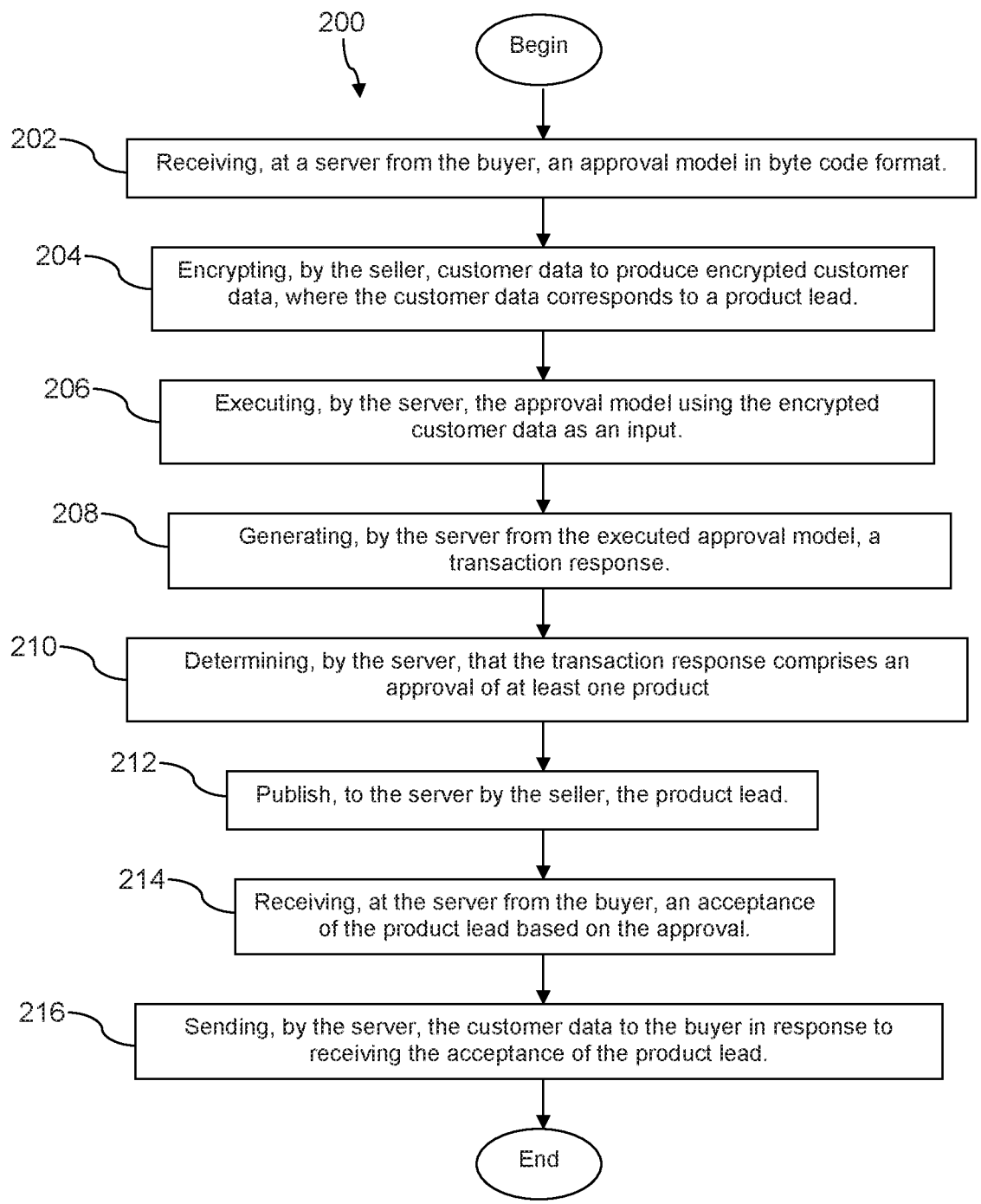
FIG. 5 is a flow chart of a method according to an embodiment of the disclosure.

Turning now to FIG. 5, a method 200 is described. In an embodiment, the method 200 is a method of anonymously matching a buyer to a seller. For example, a buyer of a lead to a customer is found to match the lead offered by the seller. The seller may be a lender who is offering the opportunity to another lender to make the loan to the customer, for example in the instance where the lender does not want to provide the loan itself. Alternatively the seller may be a merchant who is hoping to sell a consumer product to the customer, based on the customer obtaining a loan to finance payment for the consumer product. In some embodiments, the buyer can be associated with a healthcare insurance provider. In some embodiments, the buyer can be associated with a financial credit lender. The method 200 may be performed at least in part by a blockchain system such as any of the blockchain systems described with respect to FIGS. 1-4 such as blockchain system 106, for example by one or more applications executing on the seller block chain blockchain node 108.

At block 202, the method 200 comprises receiving, at a server from the buyer, an approval model in byte code format. For example, the seller blockchain server 116 receives an approval model in byte code format from the buyer blockchain node 112 or from the buyer blockchain server 120. The approval model in byte code format may be referred to as an approval model byte code package or approval model byte code file in some contexts. It is understood that the processing of block 202 may occur several different times, as different approval model byte code packages are delivered to the seller blockchain server 116. A plurality of different approval model byte code packages may be delivered to the seller blockchain server 116, for example different byte code packages corresponding to different approval models that can be concurrently valid or replacement approval models over time (e.g., a second approval model replacing an earlier approval model in the blockchain). A first approval model may be associated with a first range of customer credit scores or a first range of loan amounts. A second approval model may be associated with a second range of customer credit scores or a second range of loan amounts. These different approval models may be said to be associated with different loan products or credit products. In some cases, the processing of block 202 may involve replacing an approval model previously received by the seller blockchain server 116 with a different version of approval model that is received in block 202, for example an updated version of the approval model. In an embodiment, the server is located on a seller premises or on a seller business location. It is noted that the presence of the approval model byte code on the server does not imply or provide access to the source code version of the approval model, which may be retained confidential in either the buyer blockchain node 112 and/or in the buyer system 104.

At block 204, the method 200 comprises encrypting, by the seller, customer data to produce encrypted customer data, where the customer data corresponds to a product lead. The encryption of the customer data may be performed by a trusted execution environment present on the seller blockchain server 116, for example the trusted execution environment 134 described with reference to FIG. 3 above. The customer data may comprise PII that the seller desires and/or is obligated to retain in confidence and to secure.

At block 206, the method 200 comprises executing, by the server, the approval model byte code using the encrypted customer data as an input. Part of the processing of block 206 may involve decrypting the customer data. The customer data is provided as input to the approval model byte code during execution of the approval model byte code. The customer data may comprise tens of parameters or hundreds of parameters. In an embodiment, the customer data may comprise a list of 150 to 200 different items of information. In an embodiment, the approval model byte code is able to parse the list of customer data and extract and use those customer information parameters it desires and ignore other customer information parameters. At block 208, the method 200 comprises generating, by the server from the executed approval model, a transaction response. The transaction response may be an accept response or a reject response or some other response. In an embodiment, receiving the approval model from the buyer at the server during processing of block 202 comprises receiving the approval model in an encrypted byte code format and storing the approval model in the encrypted byte code format on the server, and executing the approval model by the server during the processing of block 206 comprises creating a decrypted approval model in byte code format by decrypting the approval model in encrypted byte code format, executing the decrypted approval model, and deleting the decrypted approval model after the execution.

At block 210, the method 200 comprises determining, by the server, that the transaction response comprises an approval of at least one product. The product may be a credit product or a loan product. The product may correspond to a particular set of terms and conditions and a maximum loan amount. In an embodiment, the processing of block 210 may determine a plurality of approvals, for example by performing the processing of blocks 206 and 208 in parallel for a plurality of different approval model byte code packages. At block 212, the method 200 comprises publishing, to the server by the seller, the product lead. The processing of block 212 may further comprise providing the lead to the buyer, for example via a blockchain transaction directed to the buyer blockchain node 112. In an embodiment, the blockchain transaction directed to the buyer blockchain node 112 is a private blockchain transaction.

At block 214, the method 200 comprises receiving, at the server from the buyer, an acceptance of the product lead based on the approval. In an embodiment, the acceptance of the product lead is received as a private blockchain transaction by the seller blockchain node 108. At block 216, the method 200 comprises sending, by the server, the customer data to the buyer in response to receiving the acceptance of the product lead. In an embodiment, the processing of block 216 may comprise the seller blockchain node 108 sending the customer data as a private blockchain transaction to the buyer blockchain node 112. Alternatively, the seller system 102 may communicate with the buyer system 104 via the network 110 independently of the blockchain system 106 to provide the customer data to the buyer. The method 200 may further comprise transferring a transaction amount from a buyer escrow account to a seller account in response to the acceptance of the product lead.

Figure 6:
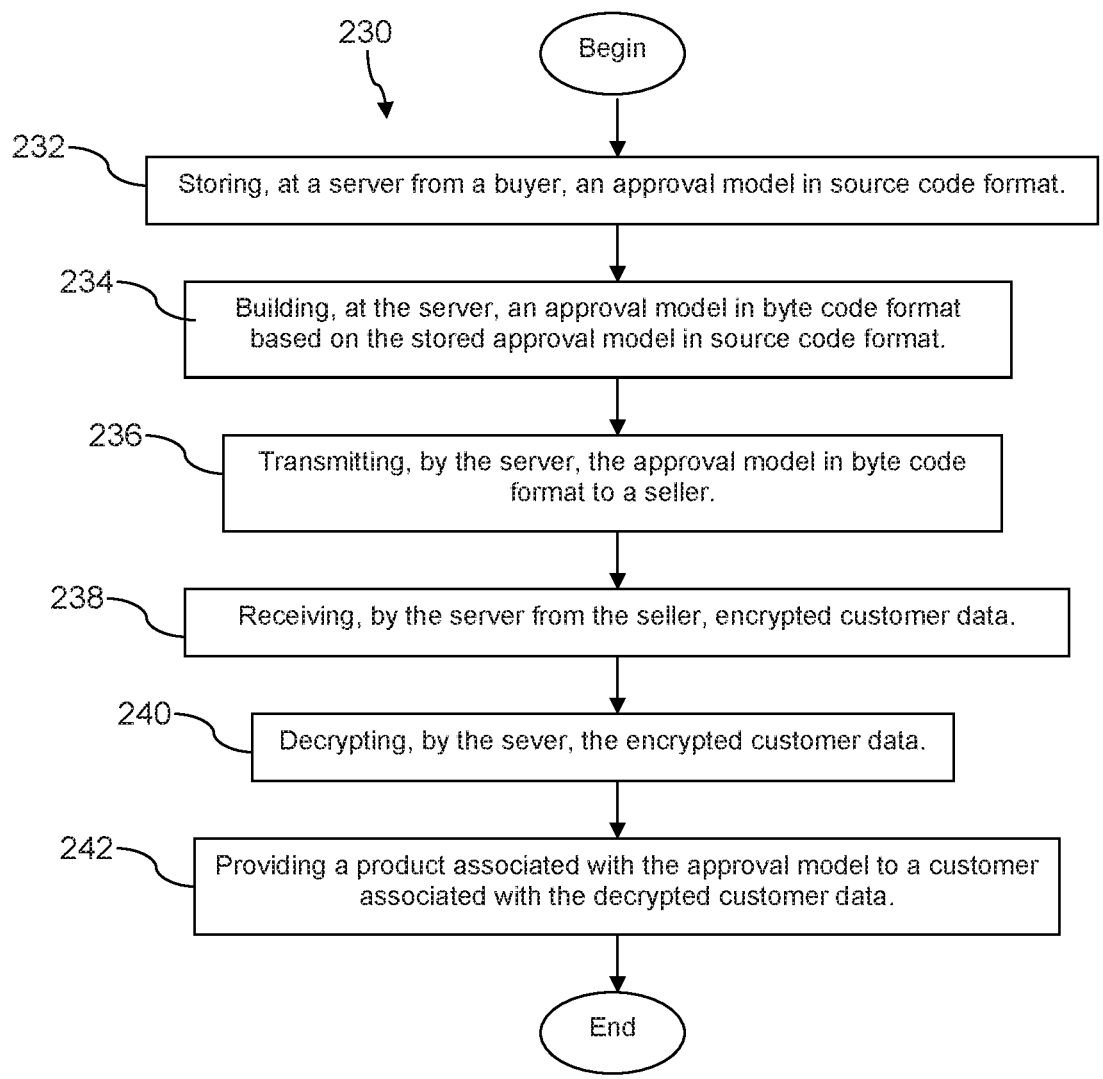
FIG. 6 is a flow chart of another method according to an embodiment of the disclosure.

Turning now to FIG. 6, a method 230 is described. In an embodiment, the method 230 is a method of anonymously matching a buyer to a seller. At block 232, the method 230 comprises storing, at a server from a buyer, an approval model in source code format. For example the source code is stored by the buyer system 104 in the buyer blockchain node 112. At block 234, the method 230 comprises building, at the server, an approval model in byte code format based on the stored approval model in source code format. For example, the approval model in source code format is compiled into the approval model in byte code format by a compiler tool. For example, the approval model source code is processed into the approval model in byte code format by a software development kit (SDK). Alternatively, the approval model in source code format is stored on the buyer system 104 and processed into the approval model in byte code format by the buyer system 104 and then is provided to the buyer blockchain node 112 in approval model byte code format.

At block 236, the method 230 comprises transmitting, by the server, the approval model in byte code format to a seller. For example, the buyer blockchain node 112 sends the approval model in byte code format to the seller blockchain node 108 as a private blockchain transaction. At block 238, the method 230 comprises receiving, by the server from the seller, encrypted customer data. For example, the buyer blockchain node 112 receives the encrypted customer data in a private blockchain transaction from the seller blockchain node 108. It is noted that receiving the encrypted customer data by the buyer blockchain node 112 indicates that the buyer has been selected to extend credit to a customer or to provide an offer of credit to a customer after the customer has been prequalified by the seller blockchain node 108 based on the seller's approval model byte code promulgated to the seller blockchain node 108 (e.g., promulgated via the processing of block 236).

At block 240, the method 230 comprises decrypting, by the sever, the encrypted customer data. At block 242, the method 230 comprises providing a product associated with the approval model to a customer associated with the decrypted customer data. For example, the buyer blockchain node 112 provides terms and conditions of a loan to the customer. For example, the buyer blockchain node 112 informs the buyer system 104, and the buyer system 104 provides terms and conditions of the loan to the customer. The processing of block 240 may further comprise transferring funds to the seller, for example to a lender who has provided the customer lead or to a merchant who is selling a consumer product to the customer paid for with the credit conferred to the customer by the buyer system 104.

Figure 7:
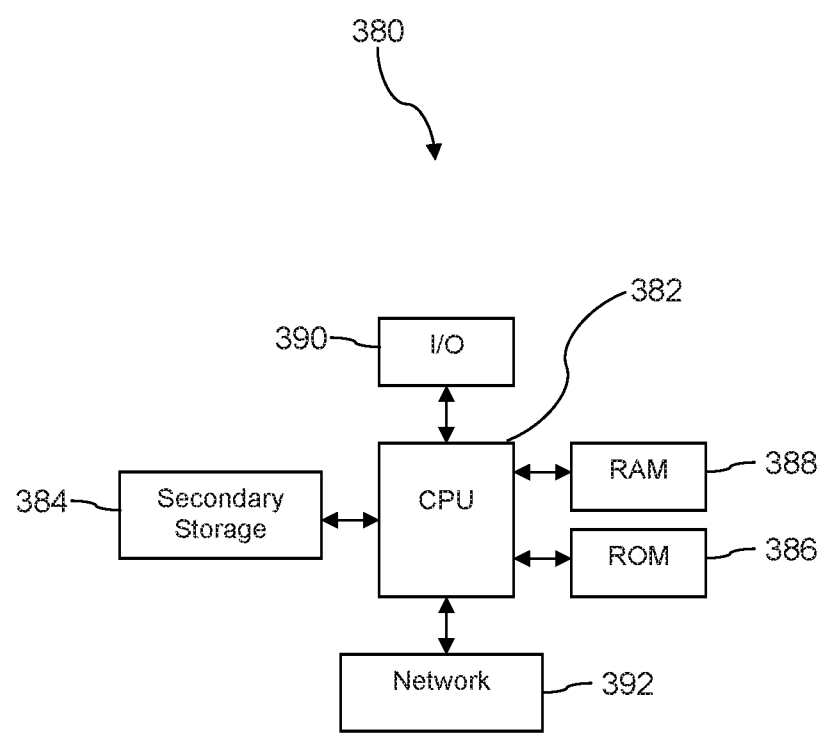
FIG. 7 is a block diagram of a computer system according to an embodiment of the disclosure.

FIG. 7 illustrates a computer system 380 suitable for implementing one or more embodiments disclosed herein. For example, the seller system 102 may be implemented by a first computer system, the buyer system 104 may be implemented by a second computer system, the seller blockchain node 108 may be implemented by a third computer system, and the buyer blockchain node 112 may be implemented by a fourth computer system. The computer system 380 includes a processor 382 (which may be referred to as a central processor unit or CPU) that is in communication with memory devices including secondary storage 384, read only memory (ROM) 386, random access memory (RAM)

388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program codes. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Having described various systems and methods herein, certain embodiments can include, but are not limited to:

In a first embodiment, a method of anonymously matching a buyer to a seller comprises: receiving, at a server from the buyer, an approval model in byte code format; encrypting, by the seller, customer data to produce encrypted customer data, where the customer data corresponds to a product lead; executing, by the server, the approval model using the encrypted customer data as an input; generating, by the server from the executed approval model, a transaction response; determining, by the server, that the transaction response comprises an approval of at least one product; publishing, to the server by the seller, the product lead; receiving, at the server from the buyer, an acceptance of the product lead based on the approval; and sending, by the server, the customer data to the buyer in response to receiving the acceptance of the product lead.

A second embodiment can include the method of the first embodiment, wherein the approval model comprises byte code related to a lending product.

A third embodiment can include the method of the second embodiment, wherein the response comprises a plurality of product identifications.

A fourth embodiment can include the method of any one of the first to third embodiments, wherein the server is located on a seller premises.

A fifth embodiment can include the method of any one of the first to fourth embodiments, further comprising transferring a transaction amount from a buyer escrow account to a seller account in response to the acceptance of the product lead.

A sixth embodiment can include the method of any one of the first to fifth embodiments, wherein a source code version of the approval model byte code is not available to the server.

A seventh embodiment can include the method of any one of the first to sixth embodiments, wherein receiving the approval model from the buyer at the server comprises receiving the approval model in an encrypted byte code format and storing the approval model in the encrypted byte code format on the server and wherein executing the approval model by the server comprises creating a decrypted approval model in byte code format by decrypting the approval model in encrypted byte code format, executing the decrypted approval model, and deleting the decrypted approval model after the execution.

An eighth embodiment can include the method of any one of the first to seventh embodiments, wherein the buyer is associated with a healthcare provider.

A ninth embodiment can include the method of any one of the first to seventh embodiments, wherein the buyer is associated with a financial credit lender.

In a tenth embodiment, a method of anonymously matching a buyer to a seller comprises: storing, at a server from a buyer, an approval model in source code format; building, at the server, an approval model in byte code format based on the stored approval model in source code format; transmitting, by the server, the approval model in byte code format to a seller; receiving, by the server from the seller, encrypted customer data; decrypting, by the sever, the encrypted customer data; and providing a product associated with the approval model to a customer associated with the decrypted customer data.

An eleventh embodiment can include the method of the tenth embodiment, wherein building the approval model in byte code format comprises compiling the approval model in source code format.

A twelfth embodiment can include the method of the tenth or eleventh embodiment, wherein building the approval model in byte code format comprises processing the approval model in source code format with a software development kit (SDK).

A thirteenth embodiment can include the method of any one of the tenth to twelfth embodiments, wherein the server is located on a buyer premises.

A fourteenth embodiment can include the method of any one of the tenth to thirteenth embodiments, wherein the product comprises terms and conditions of a loan.

A fifteenth embodiment can include the method of any one of the tenth to fourteenth embodiments, further comprising transferring a cryptocurrency amount from the buyer to the seller.

In a sixteenth embodiment, a computer system for anonymously matching a buyer to a seller comprises: at least one processor; a non-transitory memory; and an application stored in the non-transitory memory that, when executed by the processor, receives from the buyer an approval model in byte code format, encrypts customer data to produce encrypted customer data, where the customer data corresponds to a product lead, executes the approval model using the encrypted customer data as an input, generates a transaction response from the executed approval model, determines that the transaction response comprises an approval of at least one product, publishes to the buyer the product lead, receives an acceptance of the product lead based on the approval from the buyer, and sends the customer data to the buyer in response to receiving the acceptance of the product lead.

A seventeenth embodiment can include the system of the sixteenth embodiment, wherein the server executes a quorum server, and the quorum server provides a private communication channel to a seller blockchain node.

An eighteenth embodiment can include the system of the sixteenth or seventeenth embodiment, wherein the server provides an interplanetary file system communication channel as a public communication channel to the seller blockchain node.

A nineteenth embodiment can include the system of any one of the sixteenth to eighteenth embodiments, wherein the application publishes the product lead to the buyer via a blockchain transaction on the private communication channel.

A twentieth embodiment can include the system of any one of the sixteenth to nineteenth embodiments, wherein the application receives approval models in byte code format from a plurality of different buyers and executes the approval models in byte code format from the different buyers using the encrypted customer data as an input.

In a twenty first embodiment, a method of communicating between private blockchain servers comprises: receiving, by a public communication cluster node at a first private blockchain node, a transaction protocol associated with a first transaction request at the first private blockchain node; receiving, by the first private blockchain node, the first transaction request for a first transaction; sending, by the first private blockchain node, the first transaction request with the first transaction to a transaction manager using the transaction protocol; executing, by the first private blockchain node, the first transaction based on the transaction protocol; and generating, by the first private blockchain node, an output from the first transaction.

A twenty second embodiment, can include the method of the twenty first embodiment, wherein executing the first transaction comprises: encrypting the first transaction to provide a first encrypted transaction; determining a hash of the first encrypted transaction; sending, by the first private blockchain node, the first encrypted transaction and the hash to a second private blockchain node; generating, by the first private blockchain node, a second transaction request indexed by the hash; sending, by the first private blockchain node, the second transaction request to a second private blockchain node over a blockchain network; executing the second transaction request using the first encrypted transaction based on the second transaction request.

A twenty third embodiment can include the method of the twenty first or twenty second embodiment, wherein the first private blockchain node comprises a Quorum blockchain node, and wherein the blockchain network comprises a Quorum network.

A twenty fourth embodiment can include the method of any one of the twenty first to twenty third embodiments, wherein the public communication cluster node comprises an interplanetary file system (IPFS) cluster node within the first private blockchain node.

A twenty fifth embodiment can include the method of any one of the twenty first to twenty fourth embodiments, wherein the second private blockchain node comprises a Quorum blockchain node.

A twenty sixth embodiment can include the method of any one of the twenty first to twenty fifth embodiments, further comprising: initiating the first private blockchain node on the blockchain network; sending, by the public communication cluster node, communication protocol information for the first private blockchain node to the second private blockchain node over the public network; and receiving, from the second private blockchain node, a communication over the blockchain network based on based on sending the communication protocol information for the first private blockchain node over the public network.

A twenty seventh embodiment can include the method of the twenty sixth embodiment, wherein sending the communication protocol information for the first private blockchain node comprises registering the first private blockchain node within the blockchain network.

The systems and processes described herein can provide for an identification of available lending options for customers making purchases from loan originators such as merchants where the customer data is retained on the loan originator's systems. This can provide more secure lending processes that are safer for the customer's personal data while providing access to multiple lenders having models that are not available in a readable format to the loan originator.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of anonymously matching a buyer to a seller, the method comprising:
   receiving, at a server from the buyer, an approval model in byte code format, wherein the server is a first private blockchain node;
   encrypting, by the seller, customer data to produce encrypted customer data, where the customer data corresponds to a product lead;
   receiving, by a public communication cluster node at the first private blockchain node, a transaction protocol associated with a first transaction request at the first private blockchain node;
   executing, by the server, the approval model using the encrypted customer data as an input, wherein the first transaction request is the execution of the approval model using the encrypted customer data, and wherein executing the approval model using the encrypted customer data as input comprises:
      receiving, by the first private blockchain node, the first transaction request for the execution of the approval model;
      sending, by the first private blockchain node, the first transaction request with the approval model to a transaction manager using the transaction protocol; and
      executing, by the first private blockchain node, the approval model based on the transaction protocol;
   generating, by the server from the executed approval model, a transaction response, wherein generating the transaction response comprises generating, by the first private blockchain node, the transaction response from the approval model;
   determining, by the server, that the transaction response comprises an approval of at least one product;
   publishing, to the server by the seller, the product lead;
   receiving, at the server from the buyer, an acceptance of the product lead based on the approval; and
   sending, by the server, the customer data to the buyer in response to receiving the acceptance of the product lead.

2. The method of claim 1, wherein the approval model comprises byte code related to a lending product.

3. The method of claim 2, wherein the response comprises a plurality of product identifications.

4. The method of claim 1, wherein the server is located on a seller premises.

5. The method of claim 1, further comprising transferring a transaction amount from a buyer escrow account to a seller account in response to the acceptance of the product lead.

6. The method of claim 1, wherein a source code version of the approval model byte code is not available to the server.

7. The method of claim 1, wherein receiving the approval model from the buyer at the server comprises receiving the approval model in an encrypted byte code format and storing the approval model in the encrypted byte code format on the server and wherein executing the approval model by the server comprises creating a decrypted approval model in byte code format by decrypting the approval model in encrypted byte code format, executing the decrypted approval model, and deleting the decrypted approval model after the execution.

8. The method of claim 1, wherein the buyer is associated with a healthcare provider.

9. The method of claim 1, wherein the buyer is associated with a financial credit lender.

10. The method of claim 1, further comprising:
    storing, at a second server, the approval model in source code format;
    building, at the second server, the approval model in byte code format based on the stored approval model in source code format;
    transmitting, by the second server to the server, the approval model in byte code format;
    receiving, by the server from the seller, the encrypted customer data;
    decrypting, by the server, the encrypted customer data; and
    providing a product associated with the approval model to a customer associated with the decrypted customer data.

11. The method of claim 10, wherein building the approval model in byte code format comprises compiling the approval model in source code format.

12. The method of claim 10, wherein building the approval model in byte code format comprises processing the approval model in source code format with a software development kit (SDK).

13. The method of claim 10, wherein the second server is located on a buyer premises.

14. The method of claim 10, wherein the product comprises terms and conditions of a loan.

15. The method of claim 10, further comprising transferring a cryptocurrency amount from the buyer to the seller.

16. The method of claim 1, wherein executing the approval model comprises:
    encrypting the customer data to provide a first encrypted transaction;
    determining a hash of the first encrypted transaction;
    sending, by the first private blockchain node, the first encrypted transaction and the hash to a second private blockchain node;
    generating, by the first private blockchain node, a second transaction request indexed by the hash;
    sending, by the first private blockchain node, the second transaction request to a second private blockchain node over a blockchain network; and
    executing the second transaction request using the first encrypted transaction based on the second transaction request indexed by the hash on the second private blockchain node.

17. The method of claim 1, wherein the public communication cluster node comprises an interplanetary file system (IPFS) cluster node within the first private blockchain node.

18. The method of claim 16, further comprising:
initiating the first private blockchain node on the blockchain network;
sending, by the public communication cluster node, communication protocol information for the first private blockchain node to the second private blockchain node over the public network; and
receiving, from the second private blockchain node, a communication over the blockchain network based on sending the communication protocol information for the first private blockchain node over the public network.

19. The method of claim 18, wherein sending the communication protocol information for the first private blockchain node comprises registering the first private blockchain node within the blockchain network.

20. A computer system for anonymously matching a buyer to a seller, comprising:
a server, wherein the server is a first private blockchain node, and wherein the server comprises:
at least one processor;
a non-transitory memory; and
an application stored in the non-transitory memory that, when executed by the processor,
receives from the buyer an approval model in byte code format,
encrypts customer data to produce encrypted customer data, where the customer data corresponds to a product lead,
receives, by a public communication cluster node at the first private blockchain node, a transaction protocol associated with a first transaction request at the first private blockchain node,
executes the approval model using the encrypted customer data as an input, wherein the first transaction request is the execution of the approval model using the encrypted customer data, and wherein the execution of the approval model using the encrypted customer data as input comprises:
receiving, by the first private blockchain node, the first transaction request for the execution of the approval model,
sending, by the first private blockchain node, the first transaction request with the approval model to a transaction manager using the transaction protocol, and
executing, by the first private blockchain node, the approval model based on the transaction protocol;
generates a transaction response from the executed approval model, wherein the generation of the transaction response comprises generating, by the first private blockchain node, the transaction response from the approval model,
determines that the transaction response comprises an approval of at least one product,
publishes to the buyer the product lead,
receives an acceptance of the product lead based on the approval from the buyer, and
sends the customer data to the buyer in response to receiving the acceptance of the product lead.

21. The system of claim 20, wherein the server provides a private communication channel to a seller blockchain node.

22. The system of claim 21, wherein the server provides an interplanetary file system communication channel as a public communication channel to the seller blockchain node.

23. The system of claim 21, wherein the application publishes the product lead to the buyer via a blockchain transaction on the private communication channel.

24. The system of claim 20, wherein the application receives approval models in byte code format from a plurality of different buyers and executes the approval models in byte code format from the different buyers using the encrypted customer data as an input.

\* \* \* \* \*

UNITED STATES PATENT AND TRADEMARK OFFICE
CERTIFICATE OF CORRECTION

Page 1 of 1

PATENT NO. : 10,909,533 B2
APPLICATION NO. : 16/352397
DATED : February 2, 2021
INVENTOR(S) : Srivastava et al.

It is certified that error appears in the above-identified patent and that said Letters Patent is hereby corrected as shown below:

On the Title Page

Item (72) Inventor is corrected to read:
-- Tushar Srivastava, New York, (US);
Prerit Srivastava, Gurugram (IN);
Mayank Tewari, Gurugram (IN) --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*